(12) United States Patent
Kobayashi et al.

(10) Patent No.: US 7,538,468 B2
(45) Date of Patent: May 26, 2009

(54) ELECTRIC MOTOR AND ELECTRIC COMPRESSOR WITH IMPROVED HOUSING AND STATOR

(75) Inventors: Masatoshi Kobayashi, Kariya (JP); Minoru Mera, Kariya (JP); Taku Adaniya, Kariya (JP); Ai Saeki, Kariya (JP); Hiroshi Fukasaku, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 55 days.

(21) Appl. No.: 11/807,319

(22) Filed: May 24, 2007

(65) Prior Publication Data

US 2007/0273239 A1 Nov. 29, 2007

(30) Foreign Application Priority Data

May 24, 2006 (JP) ............................. 2006-144371

(51) Int. Cl.
    *H02K 1/06* (2006.01)
(52) U.S. Cl. ......................................... 310/217; 310/89
(58) Field of Classification Search ................. 310/217, 310/89, 259, 216; 417/423.7, 423.14
    See application file for complete search history.

(56) References Cited

U.S. PATENT DOCUMENTS

| | | | | |
|---|---|---|---|---|
| 4,720,649 A | * | 1/1988 | Habermann et al. | 310/90.5 |
| 5,629,575 A | * | 5/1997 | Cazal et al. | 310/91 |
| 5,982,131 A | * | 11/1999 | Aino | 318/646 |
| 6,300,693 B1 | * | 10/2001 | Poag et al. | 310/54 |

FOREIGN PATENT DOCUMENTS

| | | | |
|---|---|---|---|
| DE | 019917409 A1 | * | 10/2000 |
| JP | 62-91538 | | 4/1987 |
| JP | 2002-281698 | | 9/2002 |

* cited by examiner

*Primary Examiner*—Michael C Zarroli
(74) *Attorney, Agent, or Firm*—Locke Lord Bissell & Liddell LLP

(57) ABSTRACT

A housing of an electric motor includes an inner circumferential surface, which includes recesses arranged along the circumferential direction. On an outer circumferential surface of a stator core of a stator are provided protrusions arranged along the circumferential direction. Fitting each protrusion to the corresponding recess fixes the stator core to the housing. A rotor is provided radially inward of the stator. In a state where each protrusion is fitted to the corresponding recess, a pair of side surfaces of each protrusion are retained by a pair of inner side surfaces of the corresponding recess in the circumferential direction of the housing. A gap is formed between an end face of each protrusion and an inner bottom surface of the corresponding recess facing the end face along the entire surface of the end face.

18 Claims, 3 Drawing Sheets

ELECTRIC MOTOR AND ELECTRIC COMPRESSOR WITH IMPROVED HOUSING AND STATOR

BACKGROUND OF THE INVENTION

The present invention relates to an electric motor in which a stator core is fixed to a housing by fitting protrusions provided on the outer circumferential surface of the stator core along the circumferential direction to recesses provided in the inner circumferential surface of the housing along the circumferential direction, and to an electric compressor equipped with the electric motor.

A compressor used in a vehicle air-conditioner includes an electric compressor. A housing of the electric compressor accommodates an electric motor and a compression mechanism. The electric motor includes an annular stator and a rotor, which is located inward of the stator and is fixed to a rotary shaft. The stator includes an annular stator core and coils wound around the stator core. Fitting the stator core inside the housing fixes the stator to the housing.

In general, the stator core is fitted inside the housing by shrink fitting. That is, protrusions (for example, four), which protrude radially inward, are formed on the inner circumferential surface of the housing and are arranged at equal intervals in the circumferential direction of the housing. Then, after heating and expanding the housing, the stator core is arranged in the housing. The housing shrinks as the temperature of the housing is reduced to room temperature. The shrinkage causes the protrusions of the housing to contact the outer circumferential surface of the stator core with pressure, which completes shrink fitting.

Japanese Laid-Open Patent Publication No. 2002-281698 discloses one example of the electric motor. As shown in FIGS. 6A and 6B, an electric motor (rotating electrical machine) 100 disclosed in this publication includes a stator core 90 and a housing 92. Ribs 91 are provided on the outer circumference of the stator core 90 and are arranged at intervals in the circumferential direction of the stator core 90. Grooves 93 are formed in the housing 92 at locations corresponding to the ribs 91. Fitting the ribs 91 to the grooves 93 fixes the stator core 90 inside the housing 92.

In the above mentioned method, in which the stator core is fitted inside the housing by causing the protrusions to contact the outer circumferential surface of the stator core with pressure, regions of the stator core where the protrusions contact with pressure are pressed radially inward from a radially outer side by the protrusions. Thus, the inner circumferential shape of the stator core might deform to a shape different from the original round shape by the stress generated by the pressure. In the technique disclosed in the above publication No. 2002-281698 also, an inner bottom surface 93a of each groove 93 contacts an outer surface 91a of the corresponding rib 91 with pressure in a state where the ribs 91 are fitted to the grooves 93. Thus, regions of the stator core 90 where the ribs 91 are formed are pressed radially inward from a radially outer side by the housing 92. Therefore, the inner circumferential shape of the stator core 90 might deform to a shape different from the original round shape by the stress generated by the pressure. If such a deformation occurs, a gap between the inner circumferential surface of the stator core 90 and the outer circumferential surface of a rotor becomes uneven along the entire circumference of the rotor, which increases vibration of the housing when the electric motor is rotating.

SUMMARY OF THE INVENTION

Accordingly, it is an objective of the present invention to provide an electric motor that prevents deformation of a stator core caused by fitting the stator core inside a housing, and to provide an electric compressor.

To achieve the foregoing objective and in accordance with a first aspect of the present invention, an electric motor including a housing, a stator, and a rotor is provided. The housing includes an inner circumferential surface, which includes a plurality of recesses arranged along a circumferential direction. Each recess includes an inner bottom surface and a pair of inner side surfaces. The stator is located in the housing and includes a stator core, which includes an outer circumferential surface facing the inner circumferential surface of the housing. On the outer circumferential surface of the stator core are provided a plurality of protrusions arranged along the circumferential direction. Each protrusion includes a pair of side surfaces, which extend in a direction to intersect the circumferential direction of the stator core, and an end face, which extends along the circumferential direction of the stator core. The stator core is fixed to the housing by fitting each protrusion to the corresponding recess. The rotor is located radially inward of the stator. In a state where each protrusion is fitted to the corresponding recess, the pair of side surfaces of each protrusion are retained by the pair of inner side surfaces of the corresponding recess in the circumferential direction of the housing, and a first gap is formed between each end face and the inner bottom surface of the recess facing the end face along the entire surface of the end face.

In accordance with a second aspect of the present invention, an electric compressor is provided that includes the electric motor according to the above first aspect of the present invention, a rotary shaft, which is rotated by the electric motor, and a compression mechanism, which compresses gas in a compression chamber and discharges the gas based on rotation of the rotary shaft.

DESCRIPTION OF THE PREFERRED EMBODIMENTS

One embodiment of the present invention will now be described with reference to FIGS. 1 to 3.

Figure 1:
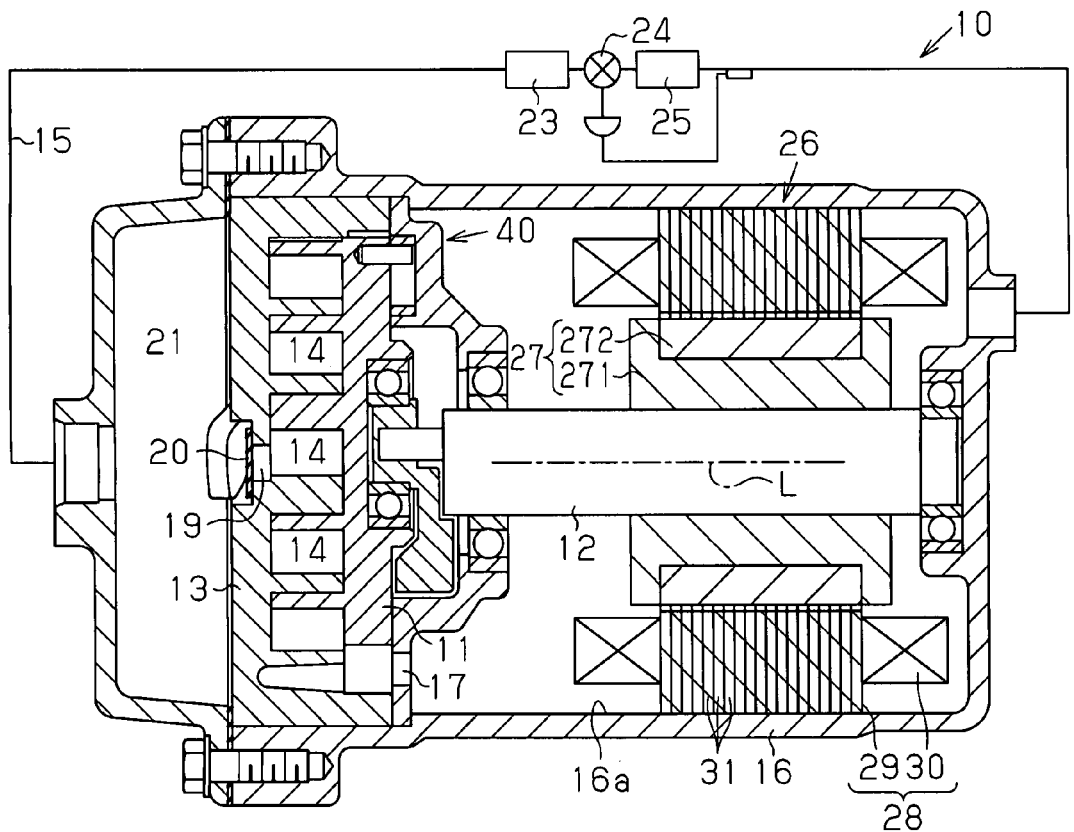
FIG. 1 is a longitudinal cross-sectional view illustrating an electric compressor according to one embodiment of the present invention.

As shown in FIG. 1, an electric compressor 10 includes an aluminum housing 16, which accommodates an electric motor 26 and a compression mechanism 40. The compression mechanism 40 is a scroll type and includes a fixed scroll 13 and a movable scroll 11. The fixed scroll 13 and the movable scroll 11 define compression chambers 14 the volume of which are variable. Furthermore, the housing 16 defines a discharge chamber 21 into which refrigerant compressed by the compression mechanism 40 is discharged.

The discharge chamber 21 is connected to a condenser 23 of an external refrigerant circuit 15. The external refrigerant circuit 15 includes the condenser 23, an expansion valve 24, and an evaporator 25. The housing 16 accommodates components of the electric motor 26, which are a rotary shaft 12, a rotor 27, and a stator 28. The rotary shaft 12 is fixed to the rotor 27 and is rotatably supported by the housing 16. Therefore, the rotary shaft 12 rotates integrally with the rotor 27.

When the rotary shaft 12 of the electric motor 26 rotates with the rotor 27, the movable scroll 11, which is coupled to the rotary shaft 12, orbits. The orbital movement of the movable scroll causes the compression chamber 14 to move toward the radial center of the compression mechanism 40 while reducing its volume. Refrigerant that is introduced into the housing 16 from the external refrigerant circuit 15 (evaporator 25) is drawn into the compression chamber 14 via a suction port 17 and is compressed in the compression chamber 14. The compressed refrigerant is discharged from a discharge port 19 to the discharge chamber 21 while opening a discharge valve 20. The refrigerant in the discharge chamber 21 flows into the external refrigerant circuit 15 and returns to the housing 16.

The configuration of the electric motor 26 will now be described in detail.

In the housing 16, the rotor 27 is fixed to the outer circumference of the rotary shaft 12 to rotate integrally with the rotary shaft 12. The rotor 27 includes a rotor core 271, which is fixed to the rotary shaft 12, and permanent magnets 272, which are provided on the circumferential surface of the rotor core 271. As shown in FIG. 2, the stator 28 is substantially annular and includes a substantially annular stator core 29, which has teeth 290, and coils 30, each of which is wound around one of the teeth 290. As shown in FIG. 1, the stator core 29 is configured by laminating silicon steel plates 31 formed by pressing along a central axis L of the rotary shaft 12. When electric current is supplied to the coils 30, the rotor 27 is rotated. Electric current is supplied to the coils 30 by switching an inverter (not shown). The stator 28 is fixed to the housing 16 by fitting the stator core 29 to the inner circumferential portion of the housing 16.

The configuration for fixing the stator 28 to the housing 16 will now be described. First, the configuration of the housing 16 will be described in detail. As shown in FIG. 2, an inner circumferential surface 16a of the housing 16 has a circular cross-section, and the inner radius of the housing 16 is set to M. As shown in FIG. 2, recesses 32 (four in this embodiment) are formed in the inner circumferential surface 16a of the housing 16 and are arranged at equal angular intervals (intervals of 90 degrees) in the circumferential direction of the housing 16. As shown in FIG. 3, an inner bottom surface 321 of each recess 32 extends along the circumferential direction of the housing 16 and is an arched surface coaxial with the inner circumferential surface 16a. The depth S of each recess 32 is constant in the circumferential direction. Also, at parts of the housing 16 where the recesses 32 are formed, the thickness of the housing 16 (dimension in the radial direction of the housing 16) is constant in the circumferential direction. The term "radial direction of the housing 16" means a direction along a straight line passing through the central axis of the housing 16 (the central axis of the housing 16 coincides with the central axis L of the rotary shaft 12). Furthermore, the explanation that "the inner bottom surface 321 of each recess 32 extends along the circumferential direction of the housing 16" refers to not only a case where the inner bottom surface 321 of each recess 32 extends to be coaxial with the inner circumferential surface 16a of the housing 16, but also a case where the inner bottom surface 321 of each recess 32 is not coaxial with the inner circumferential surface 16a of the housing 16. In this embodiment, the inner bottom surface 321 of each recess 32 extends to be coaxial with the inner circumferential surface 16a of the housing 16.

Among inner walls defining each recess 32, a pair of inner walls that extend in the direction to intersect the circumferential direction of the housing 16 and face each other in the circumferential direction of the housing 16 are referred to as inner side surfaces 322 of the recess 32. Each recess 32 is formed such that the distance between the inner side surfaces 322 that face each other gradually increases as the distance from the central axis of the housing 16 increases. That is, each recess 32 is formed such that the width in the circumferential direction of the housing 16 increases toward the radially outer end from the radially inner end. Each recess 32 extends along the entire length of the housing 16 in the axial direction.

The configuration of the stator core 29 will now be described in detail.

Figure 2:
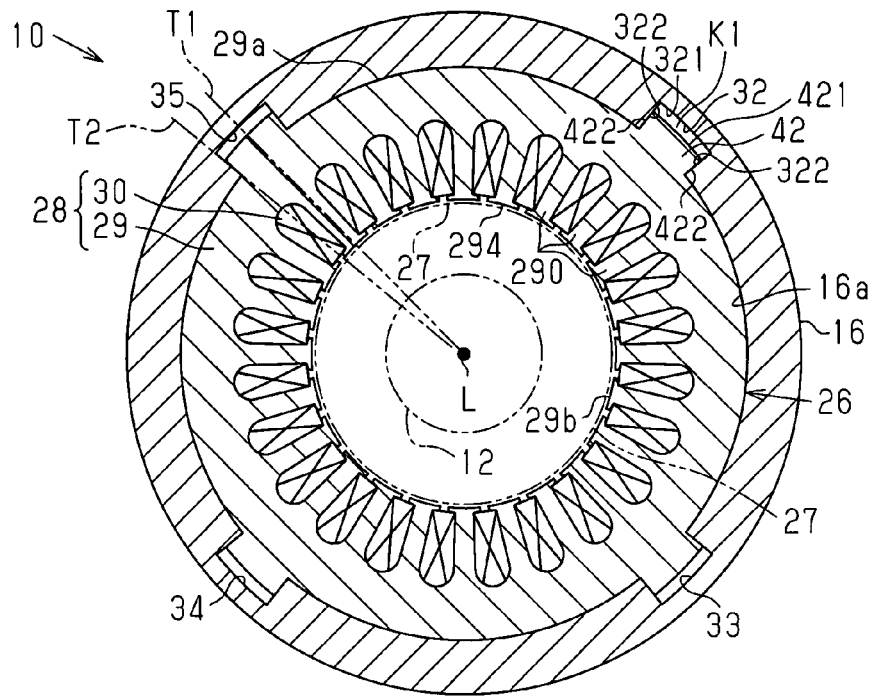
FIG. 2 is a cross-sectional view illustrating the electric motor and the housing of the electric compressor in FIG. 1.
Figure 3:
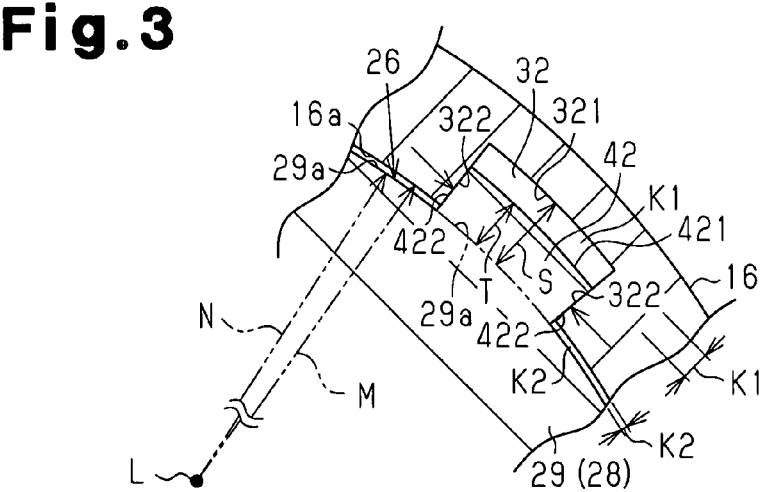
FIG. 3 is a partially enlarged cross-sectional view illustrating a fitting state between the protrusion and the recess in FIG. 2.

As shown in FIG. 2, the stator core 29 is substantially annular, and an outer circumferential surface 29a of the stator core 29 is circular at the cross-section perpendicular to the central axis L except parts where the protrusions 42 are provided. An inner circumferential surface 29b of the stator core 29, in other words, a surface that faces the outer circumferential surface of the rotor 27 and is formed by connecting end faces 294 of the teeth 290 is a circular circumferential surface. As shown in FIG. 3, the outer diameter N of the stator core 29 is set smaller than the inner diameter M of the housing 16. That is, the inner radius M and the outer radius N are set such that a small gap (second gap) K2 is formed between the inner circumferential surface 16a of the housing 16 and the outer circumferential surface 29a of the stator core 29 in the state where the stator core 29 is arranged inside the housing 16.

As shown in FIG. 2, the protrusions 42 (four in this embodiment) are provided on the outer circumferential surface 29a of the stator core 29 and extended along the direction of the central axis L. The protrusions 42 are arranged at equal angular intervals (intervals of 90 degrees) in the circumferential direction of the stator core 29 and are selectively fitted to the recesses 32 of the housing 16. As shown in FIG. 3, an end face 421 of each protrusion 42 extends along the circumferential direction of the stator core 29 and is an arched surface coaxial with the outer circumferential surface 29a of the stator core 29. The explanation that the end face 421 of each protrusion 42 extends along the circumferential direction of the stator core 29 refers to not only a case where the end face 421 extends to be coaxial with the outer circumferential surface 29a of the stator core 29, but also a case where the end face 421 is not coaxial with the outer circumferential surface 29a of the stator core 29. In this embodiment, the end face 421 of each protrusion 42 extends to be coaxial with the outer circumferential surface 29a. Therefore, the height T of each protrusion 42, that is, the protruding height of the end face 421 with respect to the outer circumferential surface 29a of the stator core 29 is constant in the circumferential direction of the stator core 29. The height T of the protrusions 42 is smaller than the depth S of the recesses 32. That is, as shown in FIG. 3, in the state where the stator core 29 is fixed inside the housing 16 by fitting the protrusions 42 to the recesses 32, a small gap (first gap) K1 is formed between the inner bottom surface 321 of each recess 32 and the end face 421 of the corresponding protrusion 42. The height T of the protrusions 42 and the depth S of the recesses 32 are set such that the gap K1 is formed.

Among the outer surfaces of each protrusion 42, a pair of surfaces that extend in a direction to intersect the circumferential direction of the stator core 29 and face in opposite directions in the circumferential direction of the stator core 29 are referred to as side surfaces 422 of the protrusion 42. A straight line represented by an imaginary line T1 in FIG. 2 is a radial line extending from the central axis of the stator core 29 (which coincides with the central axis L of the rotary shaft 12), and a straight line represented by an imaginary line T2 is a straight line extending along one of the side surfaces 422. The explanation that "the side surfaces 422 of each protrusion 42 extend in a direction to intersect the circumferential direction of the stator core 29" refers to a state where the straight line (imaginary line T2) that extends along the side surface 422 is inclined such that the straight line (imaginary line T2) is located closer to the radial line (imaginary line T1) as the straight line (imaginary line T2) approaches the central axis L from a radially outer end of the stator core 29. That is, when the imaginary line T2 extends from a radially outer end of the stator core 29 toward the central axis L, the degree of inclination of the imaginary line T2 is set such that the imaginary line T2 does not intersect the imaginary line T1 before reaching the central axis L. Each protrusion 42 is formed such that the distance between the pair of the side surfaces 422 that face in opposite directions gradually increases as the distance from the central axis of the stator core 29 increases. That is, the protrusions 42 are formed such that the width of the protrusions 42 in the circumferential direction of the stator core 29 increases toward the radially outer end from the radially inner end.

A method for fixing the stator 28 to the housing 16 will now be described.

First, the housing 16 is heated to be expanded. Subsequently, the protrusions 42 are fitted to the corresponding recesses 32 so that the stator core 29 is arranged in the housing 16. Thereafter, as the temperature of the housing 16 is reduced to room temperature, the housing 16 shrinks. The recesses 32 shrink with the shrinkage of the housing 16 so that the protrusions 42 corresponding to the recesses 32 are retained. As a result, the stator core 29 is fixed to the housing 16. That is, the shrinkage of the housing 16 causes the inner side surfaces 322 of each recess 32 to contact the side surfaces 422 of the corresponding protrusion 42 with pressure. Thus, each protrusion 42 is tightened and retained by the inner side surfaces 322 from both sides in the circumferential direction. This restricts the movement of the stator core 29 with respect to the housing 16 in the circumferential direction.

The circumferential width of each recess 32 increases as the distance from the center of the housing 16 increases, and the circumferential width of each protrusion 42 increases as the distance from the central axis of the stator core 29 increases. Therefore, in the state where the protrusions 42 are fitted to the corresponding recesses 32, the stator core 29 is restricted from moving with respect to the housing 16 in the radial direction. As a result, the stator 28 is fixed to the housing 16 so as not to be movable.

In the above mentioned shrink fitting state, the gap K1, which separates the inner bottom surface 321 from the entire surface of the end face 421, is formed between the end face 421 of each protrusion 42 and the inner bottom surface 321 of the associated recess 32. The dimension of the gap K1 in the radial direction of the stator core 29 is constant in the circumferential direction. The term "radial direction of the stator core 29" means a direction in which a straight line that passes through the central axis of the stator core 29 extends (the central axis of the stator core 29 coincides with the central axis L of the rotary shaft 12). The depth S of the recesses 32 and the height T of the protrusions 42 are set such that the gap K1 exists after fixing the stator core 29 to the housing 16 by shrink fitting. The end face 421 of each protrusion 42 is an arched surface that is coaxial with the outer circumferential surface 29a of the stator core 29, the inner bottom surface 321 of each recess 32 is an arched surface that is coaxial with the inner circumferential surface 16a of the housing 16. Therefore, the dimension of the gap K1 in the radial direction is constant in the circumferential direction of the stator core 29. Thus, when the housing 16 shrinks during shrink fitting, although each protrusion 42 is tightened by the inner side surfaces 322 of the associated recess 32 from both sides in the circumferential direction, the protrusions 42 are not pressed radially inward from a radially outer side.

In the shrink fitting state, the gap K2 is formed between part of the outer circumferential surface 29a of the stator core 29 except where the protrusions 42 are provided and part of the inner circumferential surface 16a of the housing 16 except where the recesses 32 are provided. In the state where the housing 16 has been shrunk, the dimension of the gap K2 in the radial direction of the stator core 29 is constant in the circumferential direction of the stator core 29. That is, the inner radius M of the housing 16 and the outer radius N of the stator core 29 are set such that the gap K2 exists after the stator core 29 is fixed to the housing 16 by shrink fitting. Therefore, when the housing 16 shrinks during shrink fitting, the outer circumferential surface 29a of the stator core 29 is prevented from being pressed radially inward from the radially outer side by the housing 16. Thus, in shrink fitting, the stator core 29 is not pressed from the radially outer end along the entire circumference, and the inner circumferential surface 29b of the stator core 29 is prevented from being deformed from a circular shape.

The embodiment has the following advantages.

(1) In the state where the stator core 29 has been fixed inside the housing 16 by shrink fitting, the gap K1 is formed between the end face 421 of each protrusion 42 and the inner bottom surface 321 of the corresponding recess 32, and the entire surface of the end face 421 is separate from the inner bottom surface 321. Thus, in shrink fitting, the end faces 421 are not pressed radially inward from the radially outer side of the stator core 29, which prevents the stator core 29 from being deformed by stress caused by the pressure. As a result, the inner circumferential surface 29b of the stator core 29 is prevented from being deformed from a circular shape, and the distance between the inner circumferential surface 29b of the stator core 29 and the outer circumferential surface of the rotor 27 is uniform along the entire circumference of the rotor 27. This suppresses vibration of the housing 16 when the electric motor 26 is rotated and prevents reduction in the performance of the electric motor 26.

(2) In the state where the stator core 29 has been fixed inside the housing 16 by shrink fitting, the gap K2 is formed between part of the outer circumferential surface 29a of the stator core 29 except where the protrusions 42 are provided and part of the inner circumferential surface 16a of the housing 16 except where the recesses 32 are provided. Therefore, in shrink fitting, the inner circumferential surface 16a of the housing 16 does not contact the outer circumferential surface 29a of the stator core 29 with pressure to press the outer circumferential surface 29a radially inward. Thus, the inner circumferential surface 29b of the stator core 29 is reliably prevented from being deformed from a circular shape. As a result, the distance between the inner circumferential surface 29b of the stator core 29 and the outer circumferential surface of the rotor 27 is uniform along the entire circumference of the rotor 27. This suppresses vibration of the housing 16 when the electric motor 26 is rotated and prevents reduction in the performance of the electric motor 26.

(3) The inner bottom surface 321 of each recess 32 is an arched surface that is coaxial with the inner circumferential surface 16a of the housing 16. Therefore, when forming the recesses 32, it is only required to cut the housing 16 in a manner such that the recesses 32 become coaxial with the inner circumferential surface 16a. Thus, the recesses 32 are easily formed.

(4) When the stator core 29 is fixed to the housing 16, the gap K1 is formed between the end face 421 of each protrusion 42 and the inner bottom surface 321 of the corresponding recess 32, and the gap K2 is formed between the outer circumferential surface 29a of the stator core 29 and the inner circumferential surface 16a of the housing 16. The gaps K1, K2 prevent the stator core 29 from being deformed and prevent reduction in the performance of the electric motor 26. Thus, when the electric motor 26 is used for the electric compressor 10, the electric compressor 10 is prevented from vibrating during operation.

The above mentioned embodiment may be modified as follows.

Figure 4:
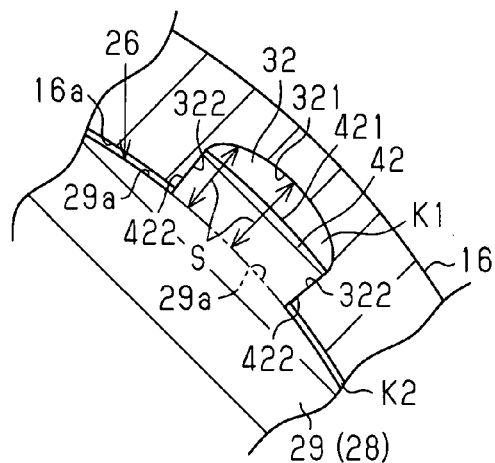
FIG. 4 is a partially enlarged cross-sectional view illustrating a modified embodiment of the recesses.

As shown in FIG. 4, the gap K1 may be formed such that the dimension of the gap K1 in the radial direction of the stator core 29 is gradually reduced from the center portion of the gap K1 in the circumferential direction of the housing 16 toward both directions. That is, the depth S of each recess 32 is the greatest at the center portion of the recess 32 in the circumferential direction of the housing 16, and is reduced toward both ends in the circumferential direction. In other words, the thickness of the housing 16 at which the recesses 32 are formed is the smallest at the position corresponding to the circumferential center of each recess 32 and increases toward both ends in the circumferential direction. Such recesses 32 permit the housing 16 to easily expand during shrink fitting around a position corresponding to the circumferential center of each recess 32. Thus, each protrusion 42 is smoothly fitted to the corresponding recess 32.

Figure 5:
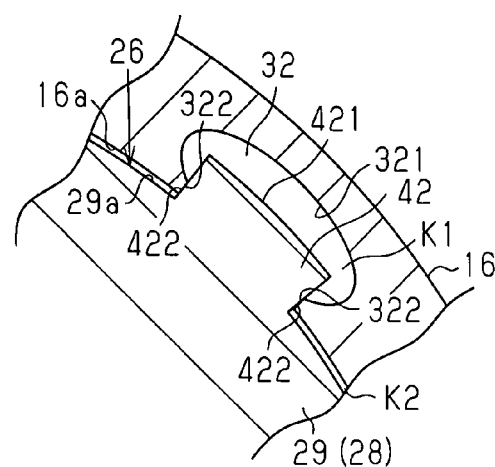
FIG. 5 is a partially enlarged cross-sectional view illustrating a modified embodiment of the recesses.
Figure 6A:
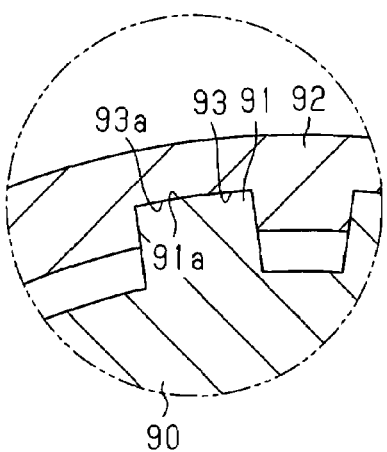
FIG. 6A is an enlarged cross-sectional view illustrating an electric motor and a housing according to a prior art.
Figure 6B:
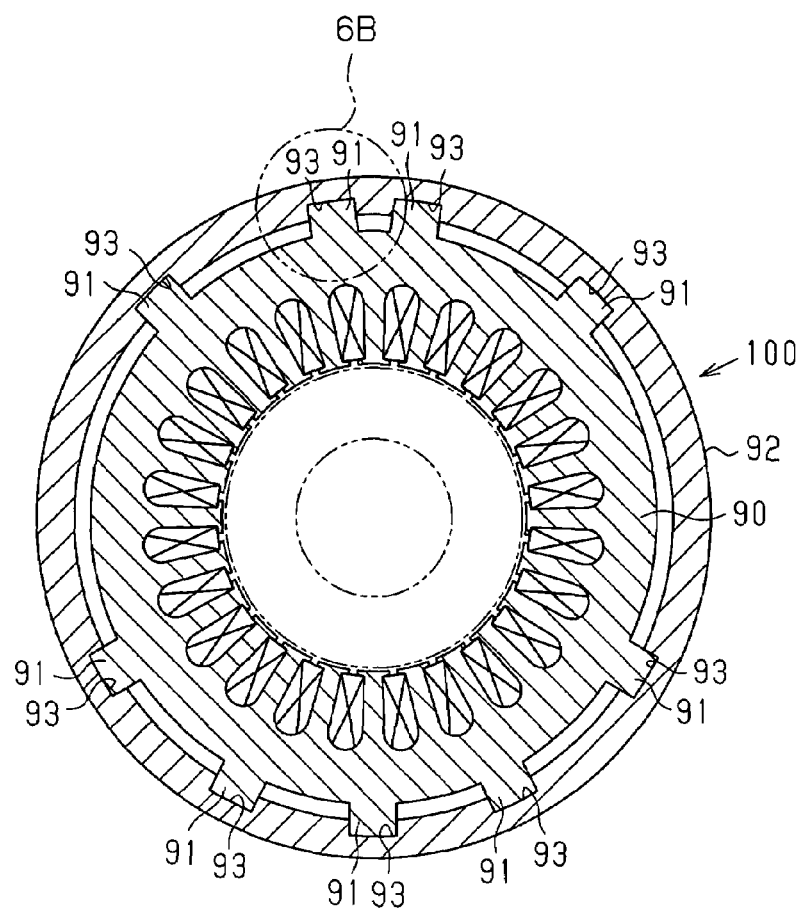
FIG. 6B is a cross-sectional view illustrating an electric motor and a housing according to a prior art.

As shown in FIG. 5, only part of the side surfaces 422 of each protrusion 42 may be retained by the inner side surfaces 322 of the corresponding recess 32.

The side surfaces 422 of each protrusion 42 may be formed such that the straight line T2 passing through the side surface 422 extends parallel to the radial line T1.

Instead of shrink fitting, the stator core 29 may be fitted to the housing 16 by press-fitting each protrusion 42 to the corresponding recess 32.

The gap K2 between the inner circumferential surface 16a of the housing 16 and the outer circumferential surface 29a of the stator core 29 may be omitted.

As long as the gap K1 is formed between the end face 421 of each protrusion 42 and the inner bottom surface 321 of the corresponding recess 32 along the entire circumferential width of the end face 421, the dimension of the gap K1 may be changed as required.

The compression mechanism 40 is not limited to a scroll type, but may be changed to, for example, a piston type or a vane type.

The stator 28 may be of a type in which a magnetic core, around which the coils 30 are wound, is fitted in the stator core 29.

The invention claimed is:

1. An electric motor comprising:
 a housing including an inner circumferential surface, which includes a plurality of recesses arranged along a circumferential direction, each recess including an inner bottom surface and a pair of inner side surfaces;
 a stator located in the housing, the stator including a stator core, which includes an outer circumferential surface facing the inner circumferential surface of the housing, wherein on the outer circumferential surface of the stator core is provided with a plurality of protrusions arranged along the circumferential direction, each protrusion including a pair of side surfaces, which extend in a direction to intersect the circumferential direction of the stator core, and an end face, which extends along the circumferential direction of the stator core, and the stator core is fixed to the housing by fitting each protrusion to the corresponding recess; and
 a rotor located radially inward of the stator, wherein, in a state where each protrusion is fitted to the corresponding recess, the pair of side surfaces of each protrusion are retained by the pair of inner side surfaces of the corresponding recess in the circumferential direction of the housing, and a first gap is formed between each end face and the inner bottom surface of the recess facing the end face along the entire surface of the end face.

2. The electric motor according to claim 1, wherein the outer radius of the stator core except parts where the protrusions are provided is smaller than the inner radius of the housing except parts where the recesses are provided.

3. The electric motor according to claim 2, wherein, in a state where each protrusion is fitted to the corresponding recess, a second gap is formed between the outer circumferential surface of the stator core except parts where the protrusions are provided and the inner circumferential surface of the housing except parts where the recesses are provided.

4. The electric motor according to claim 3, wherein a circumferential width of each recess increases as a distance from a central axis of the housing increases, and wherein a circumferential width of each protrusion increases as a distance from a central axis of the stator core increases.

5. The electric motor according to claim 4, wherein the central axis of the housing and the central axis of the stator core are coaxial, and wherein the pair of inner side surfaces and the pair of side surfaces are formed on a radial line extending from the common central axis.

6. The electric motor according to claim 1, wherein the dimension of the first gap in the radial direction of the stator core is constant in the circumferential direction of the stator core.

7. The electric motor according to claim 6, wherein the end face of each protrusion is an arched surface coaxial with the outer circumferential surface of the stator core, and the inner bottom surface of each recess is an arched surface coaxial with the inner circumferential surface of the housing.

8. The electric motor according to claim 1, wherein the dimension of the first gap in the radial direction of the stator core is gradually reduced from the center portion of the recess in the circumferential direction of the housing toward both ends.

9. The electric motor according to claim 8, wherein the end face of each protrusion is an arched surface coaxial with the outer circumferential surface of the stator core, and each recess gradually becomes shallow from the center portion of the recess in the circumferential direction of the housing toward both ends.

10. The electric motor according to claim 1, wherein only part of the side surfaces of each protrusion is retained by the corresponding inner side surfaces of the associated recess.

11. The electric motor according to claim 1, wherein the recesses and the protrusions are arranged at equal angular intervals.

12. An electric compressor comprising:

an electric motor, a rotary shaft, which is rotated by the electric motor, and a compression mechanism, which compresses gas in a compression chamber and discharges the gas based on rotation of the rotary shaft, the electric motor including:

a housing including an inner circumferential surface, which includes a plurality of recesses arranged along a circumferential direction, each recess including an inner bottom surface and a pair of inner side surfaces;

a stator located in the housing, the stator including a stator core, which includes an outer circumferential surface facing the inner circumferential surface of the housing, wherein the outer circumferential surface of the stator core is provided with a plurality of protrusions arranged along the circumferential direction, each protrusion including a pair of side surfaces, which extend in a direction to intersect the circumferential direction of the stator core, and an end face, which extends along the circumferential direction of the stator core, and the stator core is fixed to the housing by fitting each protrusion to the corresponding recess; and a rotor located radially inward of the stator, wherein, in a state where each protrusion is fitted to the corresponding recess, the pair of side surfaces of each protrusion are retained by the pair of inner side surfaces of the corresponding recess in the circumferential direction of the housing, and a gap is formed between each end face and the inner bottom surface of the recess facing the end face along the entire surface of the end face.

13. An electric motor comprising:

a housing including an inner circumferential surface, which has a first radius, the inner circumferential surface including a plurality of recesses arranged along the circumferential direction, each recess including an inner bottom surface and a pair of inner side surfaces, the inner bottom surface being located on an imaginary circle, which has a second radius greater than the first radius;

a stator located in the housing, the stator including a stator core, which includes an outer circumferential surface that faces the inner circumferential surface of the housing and has a third radius, wherein the outer circumferential surface of the stator core is provided with a plurality of protrusions arranged along the circumferential direction, each protrusion including a pair of side surfaces, which extend in a direction to intersect the circumferential direction of the stator core, and an end face, which extends along the circumferential direction of the stator core, the end face being located on an imaginary circle, which has a fourth radius that is greater than the third radius and smaller than the second radius, and the stator core is fixed to the housing by fitting each protrusion to the corresponding recess; and a rotor located radially inward of the stator, wherein, in a state where each protrusion is fitted to the corresponding recess, the pair of side surfaces of each protrusion are retained by the pair of inner side surfaces of the corresponding recess in the circumferential direction of the housing.

14. The electric motor according to claim 13, wherein the third radius is smaller than the first radius.

15. The electric motor according to claim 13, wherein the stator is supported by the housing so as to prevent relative movement in the circumferential direction.

16. The electric motor according to claim 13, wherein the housing is rigid.

17. The electric motor according to claim 13, wherein the housing is made of aluminum.

18. The electric motor according to claim 13, wherein the stator is fixed to the housing by shrink fitting.

* * * * *